April 17, 1956 F. W. BUBB 2,742,227

ELECTRICAL COMPUTER FOR SOLVING SIMULTANEOUS EQUATIONS

Filed Jan. 2, 1952 2 Sheets-Sheet 1

INVENTOR.
F. W. BUBB

BY Hudson & Young

ATTORNEYS

April 17, 1956 F. W. BUBB 2,742,227

ELECTRICAL COMPUTER FOR SOLVING SIMULTANEOUS EQUATIONS

Filed Jan. 2, 1952 2 Sheets-Sheet 2

INVENTOR.
F. W. BUBB

BY Hudson & Young

ATTORNEYS

United States Patent Office 2,742,227
Patented Apr. 17, 1956

2,742,227

ELECTRICAL COMPUTER FOR SOLVING SIMULTANEOUS EQUATIONS

Frank W. Bubb, Dayton, Ohio, assignor to Phillips Petroleum Company, a corporation of Delaware Application January 2, 1952, Serial No. 264,394

11 Claims. (Cl. 235—61)

This invention relates to computers. In one aspect it relates to a computer for solving simultaneous linear algebraic equations. In another aspect it relates to electrical circuits analogous to mathematical equations. In still another aspect it relates to improved circuit elements employed in electrical computers.

The rapid solution of sets of simultaneous linear algebraic equations is becoming an increasingly important subject in modern industry. While elementary methods of elimination or substitution are satisfactory for systems having generally not more than four variables, in larger systems the computations become extremely laborious and for practical purposes such methods of computation are extremely limited in application. Those systems having more than four variables usually are solved by methods of successive approximations; however, even this procedure requires a considerable knowledge of mathematics and also tends to become quite laborious. A practical method of solving sets of simultaneous equations is that of the Gauss-Siedel method of iteration which forms the basis for a number of recently developed computers. These computers usually employ a plurality of multiplying sets of potentiometers upon which the multiplications called for in the equations are performed while the required additions are performed by a summing network provided with current detecting means for indicating the conditions of balance. The values of the known quantities are set on appropriate potentiometers and balancing potentiometers then are adjusted in succession for each unknown until a solution is determined. Such a procedure is best suited for sets of equations which can be arranged so that the diagonal coefficients are large in comparison with the other coefficients. Infrared and mass spectrometry data generally can be so arranged, and for such applications the iteration computers known to the art operate in a satisfactory manner, although some time is required to perform the balancing operations.

However, for the more general sets of simultaneous equations the Gauss-Siedel iteration method cannot always be used, and it is toward providing a computer which is adapted for solving general sets of simultaneous linear equations that the present invention is directed, this computer not being limited, for example, to those sets of equations having dominant coefficients along the principal diagonal. The present computer further is adapted for automatic operation and is not troubled by unstable oscillations which are set up in many of the presently known computers due to the multiplicity of feedback paths employed therein.

Accordingly, it is an object of this invention to provide an improved computer capable of solving a general set of simultaneous linear algebraic equations.

Another object is to provide electrical circuits analogous to mathematical equations.

A further object is to provide a computer which is automatic in operation, reliable in result, and which is free from unstable oscillations.

A still further object is to provide improved circuit elements for use in electrical computers.

Various other objects, advantages and features of this invention should become apparent from the following detailed description taken in conjunction with the accompanying drawing illustrating a preferred embodiment of this invention in which.

Figure 1:
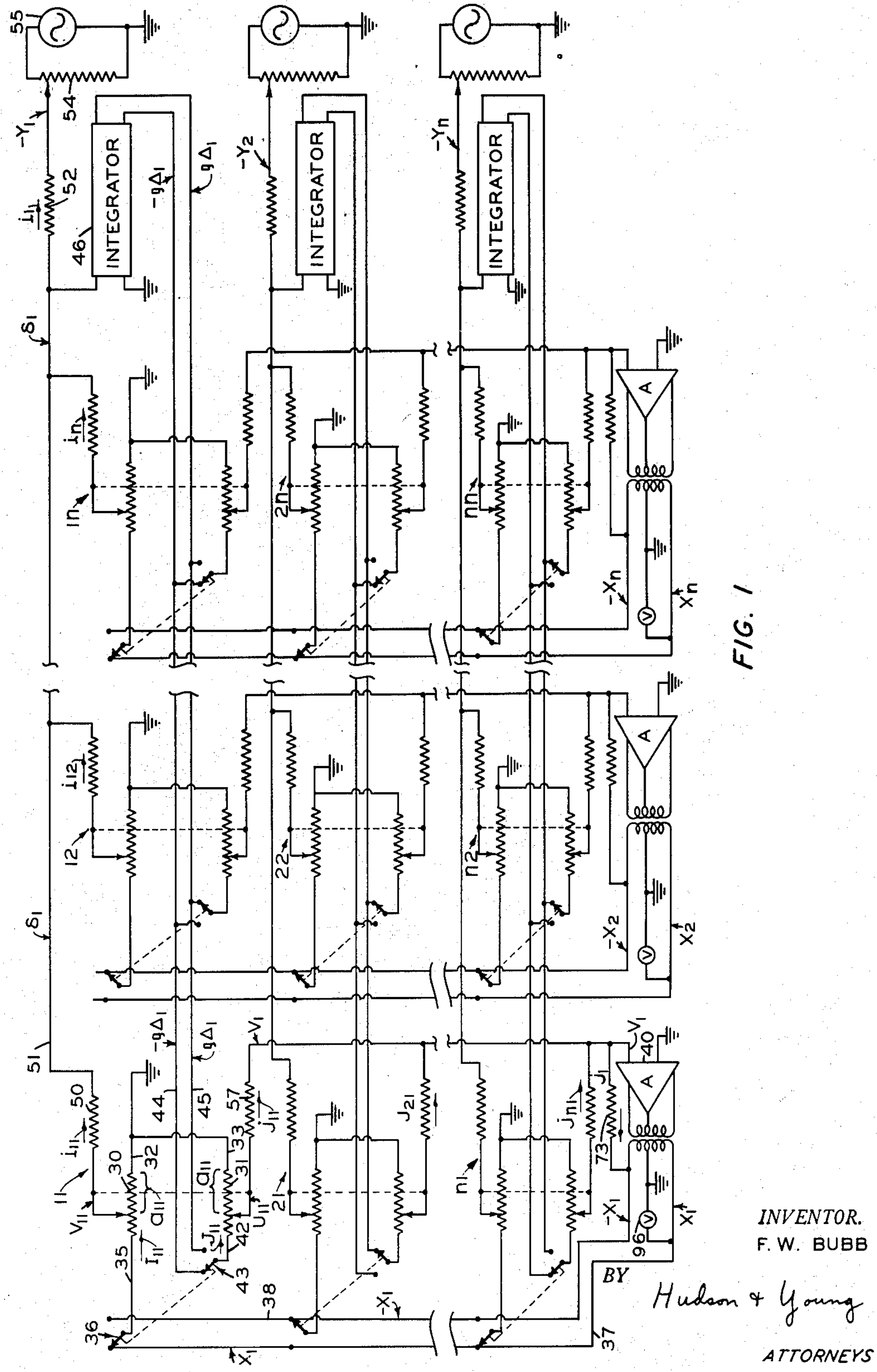
Figure 1 illustrates schematically a circuit diagram of the computer of this invention.

The computer constructed in accordance with this invention is adapted for solving the general set of simultaneous linear algebraic equations $$\sum_{j=1}^{n} a_{ij}x_j = y_i \quad (i=1 \text{ to } n, \text{ where } n \text{ is any positive integer}) \qquad (1)$$

In order to clarify this shorthand method of describing the set of equations (1), said set of equations (1) appears as follows where $n$ is taken as 3:

$$a_{11}x_1 + a_{12}x_2 + a_{13}x_3 = y_1$$
$$a_{21}x_1 + a_{22}x_2 + a_{23}x_3 = y_2$$
$$a_{31}x_1 + a_{32}x_2 + a_{33}x_3 = y_3$$

For purposes of explaining the operation of the present computer it will first arbitrarily be assumed that the following two sets of equations can be mechanized by an appropriate electrical circuit in order to solve set (1):

$$\sum_{j=1}^{n} a_{ij}x_j - y_i = E_i \quad (i=1 \text{ to } n) \qquad (2)$$

and $$\sum_{k=1}^{n} a_{kj}E_k = -A\frac{dx_j}{dt} \quad (j=1 \text{ to } n)(A>0) \qquad (3)$$

By differentiating set (2) with respect to time, noting that the $y_i$ are constants, there is obtained $$\sum_{j=1}^{n} a_{ij}\frac{dx_j}{dt} = \frac{dE_i}{dt}$$

which, when (3) is substituted therein, gives $$\sum_{j=1}^{n} a_{ij}\sum_{k=1}^{n} a_{kj}E_k = -A\frac{dE_i}{dt} \qquad (4)$$

These equations (4) constitute a set of linear simultaneous differential equations for the quantities $E_j$. In the discussion that follows it will be shown that whatever the initial values of the $x_i$ or the $E_i$ may be at $t=0$, all the $E_i$ attenuate exponentially to zero. If this be true, it should be noted that equations (2) revert to the set (1) so that in the steady state the $x_j$ represents the solutions to the original set of equations (1).

In order to solve the set of differential equations (4) let it arbitrarily be assumed that $$E_i = B_i e^{-ft} \quad (i=1 \text{ to } n) \qquad (5)$$

represents a general solution of equations (4). Substituting (5) into the set (4) and cancelling the common factor $e^{-ft}$ there is obtained $$\sum_{j=1}^{n} a_{ij}\sum_{k=1}^{n} a_{kj}B_k = AfB_i \qquad (6)$$

which can be put into the form $$\sum_{k=1}^{n}\left[\sum_{j=1}^{n} a_{ij}a_{kj} - Af\delta_{ik}\right]B_k = 0 \qquad (7)$$

where $\delta_{ik}=0$ if $i \neq k$, and $\delta_{ik}=1$ if $i=k$. Equations (7) represent a linear homogeneous set of algebraic equations for the coefficients $B_k$. It should be apparent that a solution for $B_k$ of (7) will exist if, and only if, the determinant of the set vanishes, that is, if and only if $$\text{Determinant}\left|\sum_{j=1}^{n} a_{ij}a_{kj}-Af\delta_{ik}\right|=0 \qquad (8)$$

This represents a polynominal of the $n$th degree in $f$ and will have $n$ roots, $f_p$ ($p=1$ to $n$). Corresponding to each eigenvalue $f_p$ of (8) there exists a set of $B_i$ satisfying equation (6). In order to distinguish the particular set of $B_i$ corresponding to a particular eigenvalue $f_p$ of (8) there will be attached a second subscript to the $B_i$, thus, $B_{pi}$. Therefore, from the set of equations (5) there are obtained the $n$ solutions $$E_{pi}=B_{pi}e^{-f_pt}\ (p=1 \text{ to } n,\ i=1 \text{ to } n) \qquad (9)$$

Corresponding to the particular eigenvalue $f_p$, the coefficients $B_{pi}$, in accord with (6), satisfy the equations $$\sum_{j=1}^{n} a_{ij}\sum_{k=1}^{n} a_{kj}B_{pk}=Af_pB_{pi} \quad (p=1 \text{ to } n,\ i=1 \text{ to } n) \qquad (10)$$

It further should be noted that due to the linearity of (4) the sum ($p=1$ to $n$) of the solutions (9) also is a solution to (4), $$E_i=\sum_{p=1}^{n} E_{pi}=\sum_{p=1}^{n} B_{pi}e^{-f_pt} \qquad (11)$$

Since the set of equations (10) are homogeneous, they determine a particular set of the $B_{pi}$ ($i=1$ to $n$) only up to a multiplicative constant $F_p$. Thus, for each one of the $p$ particular solutions, there is one arbitrary constant $F_p$ ($p=1$ to $n$). This provides exactly enough arbitrary adjustable constants to fit any initial given values of the $E_i$ at $t=0$, which in effect amounts to fitting any initial set of the $x_j$ at $t=0$. Hence, equations (11) constitute the general solution of equations (4).

It further can be proved that the general solution (11) for $E_i$ attentuates to zero as $t$ increases. This is true if every coefficient $f_p$ appearing in the exponentials in (11) is positive. For example, consider equations (10) in which the subscript $p$, which remains constant throughout the following discussion, will be dropped. By multiplying both sides of (10) by $B_i$ (that is, by $B_{pi}$ with the $p$ omitted) and summing over $i$ there is obtained $$\sum_{i=1}^{n} B_1\sum_{j=1}^{n} a_{ij}\sum_{k=1}^{n} a_{kj}B_k=Af\sum_{i=1}^{n} B_i^2$$

By changing the order of summation on the left and dividing through by $$\sum_{i=1}^{n} B_i^2$$

there is obtained $$\frac{\sum_{j=1}^{n}\left(\sum_{i=1}^{n} a_{ij}B_i\right)\left(\sum_{k=1}^{n} a_{kj}B_k\right)}{\sum_{i=1}^{n} B_i^2}=Af \qquad (12)$$

Since the denominator of (12) represents a summation of squares this denominator is obviously positive for all values of $B_i$. It further can be shown that the numerator of (12) also is positive. Equations (3) can, by changing the summation subscript $k$ to $i$, be written as $$\sum_{i=1}^{n} a_{ij}E_i=-A\frac{dx_j}{dt} \qquad (3')$$

Multiplying (3) by (3') gives $$\left(\sum_{i=1}^{n} a_{ij}E_i\right)\left(\sum_{k=1}^{n} a_{kj}E_k\right)=A^2\left(\frac{dx_j}{dt}\right)^2$$

which, when summed over $j$ gives $$\sum_{j=1}^{n}\left(\sum_{i=1}^{n} a_{ij}E_i\right)\left(\sum_{k=1}^{n} a_{kj}E_k\right)=A^2\sum_{j=1}^{n}\left(\frac{dx_j}{dt}\right)^2 \qquad (13)$$

Since the right side of equation (13) obviously is positive, then so must be the left side. However, since the quantities E appearing on the left side of (13) were quite arbitrarily chosen in the first place, the B's may be regarded simply as a particular set of E's. Therefore, the numerator in (12) is positive. Since both numerator and denominator on the left side of (12) are positive, it follows that $Af$ is positive. But A has already been assumed positive in (3). Hence $f$ is positive (that is to say, all the $f_p$ are positive). It follows that in the general solution (11) all the exponential time functions $e^{-f_pt}$ decrease to zero as $t$ increases so that all the $E_i$ approach zero. Equations (2) then become $$\sum_{j=1}^{n} a_{ij}x_j-y_i=0$$

that is to say, the $x_j$ approach the solution of equations $$\sum_{j=1}^{n} a_{ij}x_j=y_i \qquad (1)$$

The computer of the present invention is constructed for solving simultaneously the two sets of equations (2) and (3). This is accomplished by having the transients die out so that the steady solution gives the required values of the $x_j$ in equation (1). In order to simplify the explanation of how equations (2) and (3) are mechanized, equation (3) is first integrated giving $$-Ax_j=\int\left(\sum_{k=1}^{n} a_{kj}E_k\right)dt$$

or $$x_j=-\frac{1}{A}\sum_{k=1}^{n} a_{kj}\int E_k dt$$

By setting $$\Delta_k=-\int E_k dt$$

there is obtained $$x_j=\frac{1}{A}\sum_{k=1}^{n} a_{kj}\Delta_k$$

Therefore, in place of equations (2) and (3) the transformed set of equations $$\sum_{j=1}^{n} a_{ij}x_j-y_i=E_i \qquad (2)$$

$$-\int E_i dt=\Delta_i \qquad (14)$$

$$\frac{1}{A}\sum_{i=1}^{n} a_{ij}\Delta_i=x_j \qquad (15)$$

are mechanized in this computer in a manner such that the solution of the three sets of equations (2), (14), and (15) approaches the required solutions of equations (1) as the transients die out.

Referring now to the drawing in detail and to Figure 1 in particular, there is illustrated a computer particularly adapted for automatically solving equations (2), (14), and (15). $n^2$ network units are shown schematically, each of which includes a pair of mechanically intercoupled calibrated potentiometers upon which are set the respective $a$ coefficients of the equations being solved. The horizontal rows of potentiometer units, for example, the top row consisting of the 11, 12, . . . , 1$n$ units are connected to one another in circuit relationship representative of the equations $i=1$. In like manner the second horizontal row of 21, 22 . . . , 2$n$ units represents the equations $i=2$, etc. Each vertical column, for example, the left hand column consisting of the 11, 21, . . . , $n1$ units is connected in accordance with the equations $j=1$. For simplicity of explanation only the 11 unit, the top row, and the left column will be described in detail; it being understood that the remaining units, rows, and columns are constructed and function in like manner.

The 11 unit comprises a pair of ganged potentiometers 30 and 31 having corresponding end terminals 32 and 33, respectively, maintained at ground potential. A suitable dial, not shown, is attached to the mechanically interconnected contactors of potentiometers 30 and 31 to provide for the $a_{11}$ coefficient to be inserted simultaneously on both potentiometers 30 and 31. The second end terminal 35 of potentiometer 30 is selectively connected through switch 36 to either conductor 37 or 38 which are applied to the output of adding amplifier 40 associated with the $j=1$ column of potentiometer units. The second end terminal 42 of potentiometer 31 is selectively connected through switch 43 to either of conductors 44 or 45 which are applied to the output of integrating circuit 46 associated with the $i=1$ row of potentiometer units. Switches 36 and 43 are mechanically intercoupled so that end terminal 35 contacts conductor 37 when end terminal 42 contacts conductor 44, and end terminal 35 contacts conductor 38 when end terminal 42 contacts conductor 45. The contactor of potentiometer 30 is connected through resistor 50 to conductor 51, which in turn is connected to the input of integrating circuit 46. An A. C. voltage representing the constant $y$ term of the equations $i=1$ also is applied to the input of integrating circuit 46 through resistor 52, this voltage being obtained from voltage divider 54 which is coupled across A. C. voltage source 55. The contactor of potentiometer 31 is connected through resistor 57 to the input of adding amplifier 40. Units 12, . . . , $1n$ are connected to integrating circuit 46 in a manner similar to the connection of unit 11, while units 21, . . . , $n1$ are connected to adding amplifier 40 in a manner similar to the connection of unit 11.

With reference to potentiometer unit 11 the coefficient $a_{11}$ is set simultaneously on the two ganged potentiometers 30 and 31. Assuming $a_{11}$ to be positive, then switch 36 is positioned to make contact with conductor 37, and switch 43 is positioned to make contact with conductor 44. For the purpose of writing circuit equations for this computer, the following conditions are assumed (all voltages being taken with respect to ground): the instantaneous voltage on conductor 37 is $x_1$, the instantaneous voltage on conductor 44 is $-g\Delta_1$, the instantaneous voltage on conductor 51 is $\delta_1$, the instantaneous voltage on the contactor of potentiometer 30 is $V_{11}$, the instantaneous input voltage to amplifier 40 is $V_1$, the instantaneous voltage on the contactor of potentiometer 31 is $U_{11}$, the instantaneous voltage on the divider side of resistance 52 is $-y_1$, resistors 50 and 52 each have ohmic resistances R, potentiometers 30 and 31 each have ohmic resistances $r$, the instantaneous current through resistor 50 is $i_{11}$, the instantaneous current through resistor 52 is $i_1$, the instantaneous current through that section of potentiometer 30 from terminal 35 to the contactor is $I_{11}$, the instantaneous current through the section of potentiometer 31 from terminal 42 to the contactor is $J_{11}$, and the instantaneous current through resistor 57 is $j_{11}$, all of said currents being in the direction indicated by the small arrows. In accordance with Kirchhoff's laws, circuit equations for the 11 unit can be written as follows:

$$\left.\begin{aligned} x_1-V_{11}&=I_{11}(1-a_{11})r\\ V_{11}&=(I_{11}-i_{11})a_{11}r\\ V_{11}-\delta_1&=Ri_{11}\end{aligned}\right\}\qquad(16)$$

A solution of these equations gives $$\left.\begin{aligned} i_{11}&=\frac{a_{11}x_1-\delta_1}{R+a_{11}(1-a_{11})r}\\ I_{11}&=\frac{x_1}{r}+\frac{a_{11}(a_{11}x_1-\delta_1)}{R+a_{11}(1-a_{11})r}\\ V_{11}&=\frac{a_{11}x_1-\delta_1}{1+a_{11}(1-a_{11})\frac{r}{R}}+\delta_1\end{aligned}\right\}\qquad(16')$$

By assuming that the resistances of $r$ and R are of the order of 1,000 ohms and 500,000 ohms, respectively, and since the maximum value of $a_{11}(1-a_{11})$ obviously is ¼; it follows that $R+a_{11}(1-a_{11})r$ differs from R by less than 1 part in 2000. Accordingly, equations (16′) can be written to a practical degree of approximation as $$\left.\begin{aligned} i_{11}&=\frac{a_{11}x_1-\delta_1}{R}\\ I_{11}&=\frac{x_1}{r}\\ V_{11}&=a_{11}x_1\end{aligned}\right\}\qquad(16'')$$

or more generally for any potentiometer unit $$\left.\begin{aligned} i_{ij}&=\frac{a_{ij}x_j-\delta_i}{R}\\ I_{ij}&=\frac{x_j}{r}\\ V_{ij}&=a_{ij}x_j\end{aligned}\right\}\qquad(17)$$

Figures 2, 3:
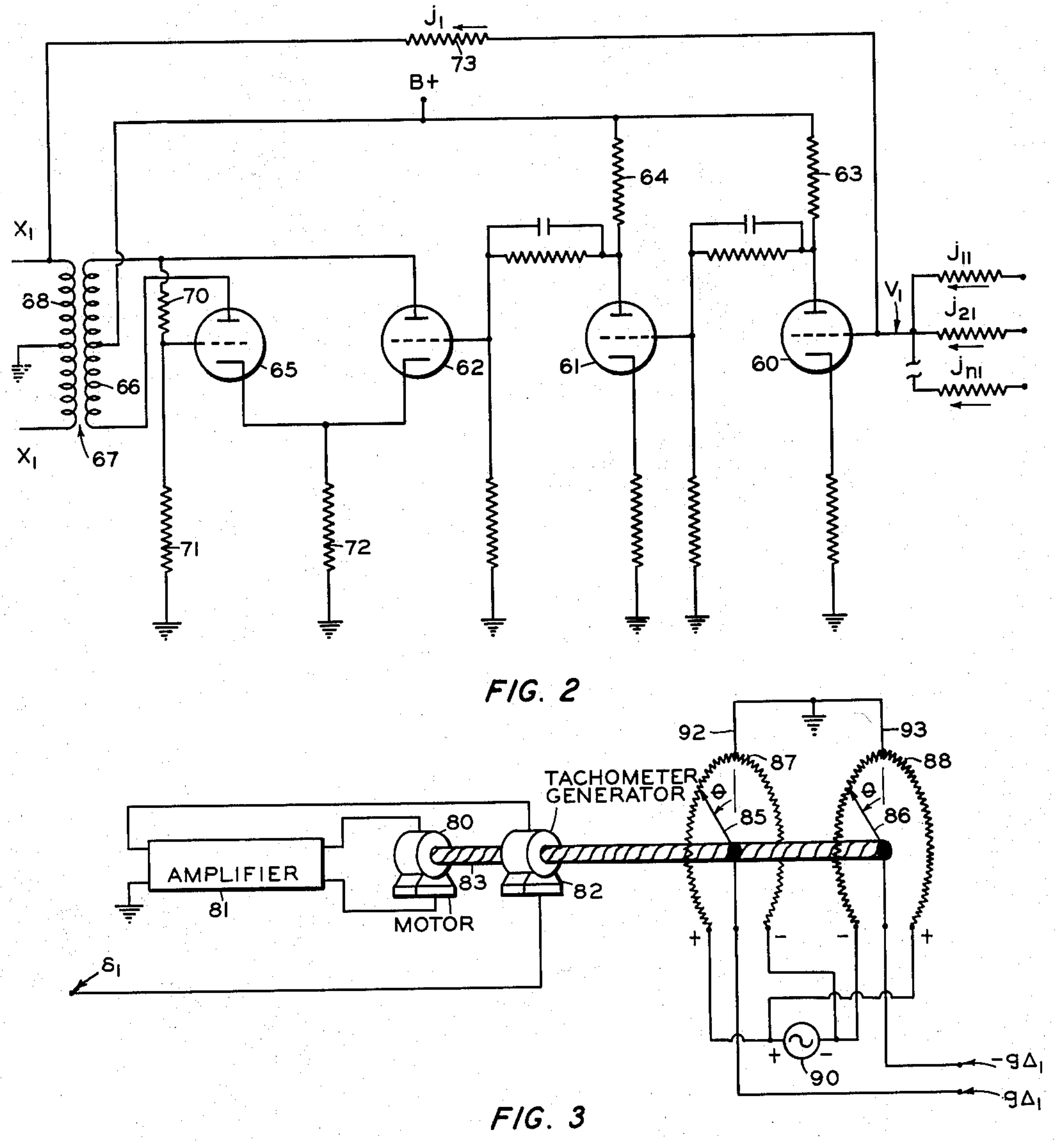
Figure 2 illustrates schematically an adding amplifier employed in the computer of Figure 1.
Figure 3 illustrates an integration circuit employed in the computer of Figure 1.

At the bottom of the left hand column representing $j=1$ there is shown a schematic representation of an adding amplifier 40 which is illustrated in somewhat greater detail in Figure 2. The input voltage $V_1$, taken with respect to ground, is applied to the control grid of a vacuum tube triode 60 which forms the first stage of a resistance-capacitance coupled three stage amplifier unit made up of triodes 60, 61, and 62. The plate voltage from source B+ is applied to the plates of triodes 60 and 61 through resistors 63 and 64, respectively, and to the plate of third triode 62 through the upper half of the primary coil 66 of output transformer 67, said voltage B+ being applied to the center tap of coil 66, one end terminal of which is connected to the plate of triode 62. The second end terminal of coil 66 is connected to the plate of a fourth triode 65, the control grid of which is maintained at a variable bias by resistors 70 and 71 which connect said grid to the output of triode 62 and ground, respectively. The cathodes of triodes 62 and 65 are connected to one another and grounded through a common resistor 72. As illustrated, the triodes 62 and 65 thus operate in opposition to one another to regulate the net current pulses flowing through the primary coil 66 of transformers 67. The secondary coil 68 of transformer 67 has a grounded center tap so as to provide output voltages of equal magnitude and opposite instantaneous polarity. The secondary coil 68 also is coupled to the input to first triode 60 by means of a feedback resistor 73. Amplifiers of the type herein illustrated are more fully described in the article "Analysis of problems in dynamics by electronic circuits" by Ragazzini, Randall, and Russell in Proc. I. R. E., vol. 35, May 1947, pp. 444–453.

The instantaneous input voltage to amplifier 40 is designated by $V_1$ while the output instantaneous voltages are $x_1$ and $-x_1$. Relating to potentiometer 31 the following additional circuit equations are applicable:

$$\left.\begin{aligned} -g\Delta_1-U_{11}&=J_{11}(1-a_{11})r\\ U_{11}&=(J_{11}-j_{11})a_{11}r\\ U_{11}-V_1&=Rj_{11}\end{aligned}\right\}\qquad(18)$$

Since adding amplifier 40 provides an output voltage $$x_1=-\mu V_1\qquad(19)$$

where $\mu$ is the amplification factor for said amplifier, a solution for equations 18 becomes $$\left.\begin{aligned} j_{11}&=\frac{-a_{11}g\Delta_1+\frac{x_1}{\mu}}{R+a_{11}(1-a_{11})r}\\ J_{11}&=\frac{-g\Delta_1}{r}+\frac{a_{11}\left(-a_{11}g\Delta_1+\frac{x_1}{\mu}\right)}{R+a_{11}(1-a_{11})r}\\ U_{11}&=\frac{-a_{11}g\Delta_1+\frac{x_1}{\mu}}{1+a_{11}(1-a_{11})\frac{r}{R}}-\frac{x_1}{\mu} \end{aligned}\right\} \quad (18')$$

By designing amplifier 40 so that $\mu$ is very large and since $$\frac{r}{R}$$

is very small, to a close approximation equations 18′ can be rewritten as $$\left.\begin{aligned} j_{11}&=\frac{-a_{11}g\Delta_1}{R}\\ J_{11}&=\frac{-g\Delta_1}{r}\\ U_{11}&=-a_{11}g\Delta_1 \end{aligned}\right\} \quad (18'')$$

or more generally for any of the lower potentiometer units, $$\left.\begin{aligned} j_{ij}&=-\frac{a_{ij}g\Delta_i}{R}\\ J_{ij}&=-\frac{g\Delta_i}{r}\\ U_{ij}&=-a_{ij}g\Delta_i \end{aligned}\right\} \quad (20)$$

Since it is apparent that the total current flow up to the voltage point designated $\delta_1$, which is an input to integrator circuit 46, must equal the total current flow away from said point, the following relationship is applicable:

$$i_{11}+i_{12}+\ .\ .\ .\ +i_{1n}=i_1$$

Upon combining the first equation of (17) with the obvious equation $$i_1=\frac{\delta_1-(-y_1)}{R}$$

there is obtained $$\frac{a_{11}x_1-\delta_1}{R}+\frac{a_{12}x_2-\delta_1}{R}+\ .\ .\ .\ +\frac{a_{1n}x_n-\delta_1}{R}=\frac{\delta_1+y_1}{R}$$

or $$a_{11}x_1+a_{12}x_2+\ .\ .\ .\ +a_{1n}x_n-y_1=(n+1)\delta_1$$

In a more general fashion the equations for the $i$th row of potentiometers can be written $$\sum_{j=1}^{n} a_{ij}x_j-y_i=(n+1)\delta_1 \quad (21)$$

which differs from equations (2) only in the right hand member.

Considering now the currents from the lower potentiometers in the left hand column represented by $j=1$, the following equation can be written $$j_{11}+j_{21}+\ .\ .\ .\ +j_{n1}=j_1$$

since it is apparent that negligible current flows to the grid of the first stage of the adding amplifier 40; that is, the sum of the individual currents equals $j_1$, the current through the feedback resistance 73. By using the first equation of (20) and the simple relationship $$j_1=\frac{v_1-(-x_1)}{R}=\frac{-\frac{x_1}{\mu}+x_1}{R}\cong+\frac{x_1}{R}$$

where R is the ohmic resistance of resistor 73, there is obtained $$-\frac{a_{11}g\Delta_1}{R}-\frac{a_{21}g\Delta_2}{R}-\ .\ .\ .\ -\frac{a_{n1}g\Delta_n}{R}=+\frac{x_1}{R}$$

or $$g(a_{11}\Delta_1+a_{21}\Delta_2+\ .\ .\ .\ +a_{n1}\Delta_n)=-x_1$$

which can be written more generally for the $j$th column of potentiometers as $$g\sum_{i=1}^{n} a_{ij}\Delta_i=-x_j \quad (22)$$

It should thus be apparent that equation (22) is identical with equation (15) if $$g=-\frac{1}{A}$$

In the right hand side of the row $i=1$ of this computer there is shown an integrating circuit 46. This integrating circuit is illustrated in greater detail in Figure 3 as comprising a velocity controlled servomechanism employing tachometric feedback. A motor 80 driven by servoamplifier 81 and a tachometer generator 82 are connected by a common drive shaft 83. In case direct current is used with this computer, both motor and tachometer generator are direct current devices; in case alternative current is used, these devices should be of the induction type. The input voltage $\delta_1$, taken with respect to ground, is applied through generator 82 to amplifier 81. By connecting the output of generator 82 in series with and opposing the input voltage $\delta_1$, the generator voltage remains approximately equal to the input voltage and thus serves the function of a feedback path. Drive shaft 83 rotates a pair of contactors 85 and 86 of similar potentiometers 87 and 88, respectively. An A. C. voltage source 90, properly phased with respect to the A. C. source 55 to provide the indicated instantaneous polarities, is connected across end terminals in parallel of each of potentiometers 87 and 88, and the center taps of said potentiometers are grounded through leads 92 and 93, respectively. The loop containing servoamplifier 81, motor 80, and generator 82 can be regarded as a voltage amplifier wherein integration is performed by virtue of the proportionality between the speed of the generator shaft and its output voltage, so that the shaft position 0 is the integral with respect to time of the generator voltage. The output instantaneous voltages $g\Delta_1$ and $-g\Delta_1$ taken from contactors 85 and 86, respectively, are of equal magnitude but opposite sign. For a more complete description of the integrator circuit herein employed reference is made to Massachusetts Institute of Technology, Radiation Laboratory Series, volume 20, page 305 (McGraw-Hill Book Co., Inc., N. Y., 1949).

By assigning to this integrating circuit a multiplying factor C which is a circuit constant, and taking the negative sign, there is obtained the relationship $$g\Delta_1=-C\int\delta_1 dt$$

or for the $i$th integrator $$\Delta_1=-\frac{C}{g}\int\delta_1 dt \quad (23)$$

In order to identify equations (2) and (21) there is written $$(n+1)\delta_i=E_i \quad (24)$$

in order to identify equations (15) with (22) it is assumed $$g=\frac{-1}{A} \quad (25)$$

and to identify equations (14) with equations (23)

$$C=\frac{n+1}{A} \quad (26)$$

This last equation (26) gives the integrator constant C.

Referring now to the characteristic determinant equation (8) it can be seen that the eigenvalues $f_p$ are proportional to $$\frac{1}{A}$$

This means that the $f_p$ are proportional to the amplification ratio C of the integrators as can be seen from equations (26). Therefore, the larger the value of C the more rapidly do the transients die out and more quickly does the computer settle down to the steady state solution of equations (1) thereby resulting in an important feature of the computer since the speed with which the transients attenuate to give the steady state solution of the linear algebraic equations can be adjusted by varying the integrating factor C. This integration factor can be increased to increase the attenuation to such a degree that a solution of equations (1) can be obtained within a fraction of a second if necessary. Such a property makes the computer extremely useful in combination with automatic control mechanisms.

From the foregoing discussion it should be apparent that the computer provided by this invention is particularly adapted for solving equations in the form $$\sum_{j=1}^{n} a_{ij}x_j = y_i \qquad (i=1 \text{ to } n) \qquad (1)$$

Each equation of the set (1) can first be divided by the largest $a$ coefficient contained therein so that all of the $a$ coefficients can be regarded as fractions. Each $a$ coefficient is set on the appropriate pair of ganged potentiometers, such as for example, the $a_{11}$ coefficient being set on potentiometers 30 and 31. Assuming $a_{11}$ to be positive, then potentiometer 30 is connected to conductor 37 through switch 36 as illustrated, and potentiometer 31 is connected to negative conductor 44. If some coefficient is negative, such as $a_{12}$, then the potentiometer connections to the respective conductors are reversed as illustrated for the 12 unit. On the matrix of the dials, not shown, which appear on the operating face of this computer there is placed beside each coefficient dial a switch, such as ganged switches 36 and 43, for setting the coefficients either positive or negative as herein described. Each $y$ term is set on an appropriate voltage divider, such as 54 for $y_1$; and the resulting $x$ solutions which appear as voltages are measured by suitable voltmeters such as 96 positioned between conductor 37 and ground to measure $x_1$.

The feature that the solutions to the equations solved by this computer take the form of output voltages makes such a computer particularly adapted for automatic control operations. For example, the results of a particular analysis automatically can be inserted into this computer, calculation made thereby, and the solution output voltages fed directly to suitable control mechanism. Analysis of hydrocarbons by infrared spectrometry, for example, is one of many fields of operation where solutions of simultaneous equations are involved in control problems.

Upon consideration it should be apparent to those skilled in the art that various modifications can be made without departing from the scope of this invention. For example, the integrating circuit is in no way restricted to the particular form illustrated. Various other mechanical or electronic integrators well known to those skilled in the art could replace the particular circuit shown in Figure 3. The same is true with the adding amplifier of Figure 2. The computer can be driven by D. C. sources 55, in which case the source 90 of the integrator should be D. C. and a D. C. adder unit should be used for unit 40. If negative coefficients are not encountered in a particular application, the described circuit can be simplified somewhat by the elimination of the double outputs from the integrators and adding amplifiers, and the corresponding potentiometer switching arrangement. It further should be noted that while the reference voltages $-y_1, -y_2, \ldots, -y_n$ are illustrated as being taken from voltage dividers such as 54, any other source of variable reference voltage can be used in place thereof.

Thus, while my invention has been described in conjunction with a present preferred embodiment, I do not intend to be restricted thereto, but rather only by the scope of the appended claims allowed herein.

I claim:

1. An electrical computer for determining the $n$ solutions of a system of linear algebraic equations having $n$ variables, where $n$ is a positive integer greater than unity, comprising, in combination; $n$ circuits, each of said $n$ circuits comprising $n$ first and $n$ second potentiometers, the contactors of said first potentiometers being mechanically connected to the contactors of respective ones of said second potentiometers, means for applying first voltages across the end terminals of said first potentiometers, means for summing the voltages taken between the contactors and corresponding first end terminals of each of said first potentiometers, a voltage integrating circuit, a reference voltage, means for connecting said summed voltage in opposition to said reference voltage and for applying the resulting net voltage to the input of said integrating circuit, and means for applying the output voltage of said integrating circuit across the end terminals of each of said second potentiometers; $n$ voltage summing circuits connected for adding the voltages taken between the contactors and corresponding first end terminals of corresponding second potentiometers in each of said $n$ circuits; and means for applying said added voltages across the end terminals of said corresponding first potentiometers in said circuits, said added voltages being said first voltages and representing the solutions of said system of equations.

2. The combination in accordance with claim 1 wherein said voltage integrating circuits provide both positive and negative output voltages of equal magnitude and wherein said voltage summing circuits provide both positive and negative voltages of equal magnitude, and further comprising switching means associated with each of said pairs of potentiometers, said switching means being adapted to apply a negative output voltage from an integrating circuit across an associated second potentiometer when a positive output voltage from a summing amplifier is applied across the first potentiometer coupled to said associated second potentiometer and being adapted to apply a positive output voltage from said integrating circuit across said associated second potentiometer when a negative output voltage from said summing amplifier is applied across the first potentiometer coupled thereto.

3. An electrical computer for determining the $n$ solutions of a system of linear algebraic equations having $n$ variables where $n$ is a positive integer greater than unity, comprising, in combination; $n$ voltage summing circuits, $n$ groups of $n$ first potentiometers, the end terminals of the individual potentiometers in each group being connected in parallel, the output terminals of said summing circuits being applied across the end terminals of respective groups of said first potentiometers, the contactor settings of said first potentiometers being representative of the coefficients of respective terms in said system of equations; $n$ voltage integrating circuits, $n$ groups of $n$ second potentiometers, the end terminals of the individual potentiometers in each of said second groups being connected in parallel, the output terminals of said integrating circuits being applied across the end terminals of respective groups of said second potentiometers, the contactor settings of said second potentiometers also being representative of the coefficients of respective terms in each of the equations in said system of equations, the contactors of said first and second potentiometers which correspond to like terms in said equations having their contactors mechanically connected; $n$ voltage sources each representative of a constant term in said system of equations; means for adding the voltages between the contactors and corresponding first end terminals of said first potentiometers in each of said first groups which represent terms in the same equation, means for applying said added voltages in opposition to the respective voltage sources and for applying the resulting voltages to the inputs of respective ones of said integrating circuits, and means for applying the output voltages from said integrating circuits across the end terminals of said first potentiometers in each of said second groups which represent terms in the same equation, the input voltages to each of said summing circuits being the voltages between the contactors and corresponding first end terminals of said second potentiometers in each of said second groups which represents corresponding terms in each of said equations, the output voltages of said summing circuits representing the solutions of said equations.

4. A computer for evaluating all $n$ of the $x_j$ in a system of equations of the form $$\sum_{j=1}^{n} a_{ij}x_j = y_i$$

where $i=1$ to $n$, $n$ being any positive integer, and $y_i$ being constants, comprising in combination; $n$ electrical circuits, each representing an individual equation in said system, each of said circuits having $n$ first potentiometers included therein, the contactor settings of said first potentiometers representing respective $a$ values, means for applying voltages across the end terminals of each of said $n$ first potentiometers representing respective $x$ values, a voltage source representing a $y$ value, means for summing the voltages taken off said first potentiometers between the contactors and respective first end terminals thereof, a voltage integrating circuit, and means for connecting said summed voltage in opposition to said $y$ voltage and for applying the resulting voltage to the input of said integrating circuit; and means responsive to the integrating circuits output voltages for adjusting the $x$ voltages until the input voltages to all $n$ of the integrating circuits each are zero.

5. A computer for evaluating all $n$ of the $x_j$ in a system of equations of the form $$\sum_{j=1}^{n} a_{ij}x_j = y_i$$

where $i=1$ to $n$, $n$ being any positive integer, and $y_i$ being constants, comprising in combination; $n$ electrical circuits, each representing an individual equation in said system, each of said circuits having $n$ first potentiometer included therein, the contactor settings of said first potentiometer representing respective $a$ values, means for applying voltages across the end terminals of each of said $n$ first potentiometers representing respective $x$ values, a voltage source representing a $y$ value, means for summing the voltages taken off said first potentiometers between the contactors and respective first end terminals thereof, a voltage integrating circuit, and means for connecting said summed voltage in opposition to said $y$ voltage and for applying the resulting voltage to the input of said integrating circuit; $n^2$ second potentiometers, the contactor of each being mechanically coupled to the contactor of a respective one of said first potentiometers, and means connecting the output voltages of each of said integrating circuits across the end terminals of each of the second potentiometers connected to the first potentiometers in circuit with the respective integrating circuits; means for summing the voltages taken between the contactors and respective first end terminals of the second potentiometers which represent like terms in said system of equations; and means for adjusting the $x$ voltages in response to said last-mentioned summed voltages until the input voltages to said integrating circuits each are zero.

6. A computer for evaluating all $n$ of the $x_j$ in a system of equations of the form $$\sum_{j=1}^{n} a_{ij}x_j = y_i$$

where $i=1$ to $n$, $n$ being any positive integer, and $y_i$ being constants, comprising in combination; $n$ electrical circuits, each representing an individual equation in said system, each of said circuits having $n$ first potentiometer included therein, the contactor settings of said first potentiometer representing respective $a$ values, means for applying voltages across the end terminals of each of said $n$ first potentiometers representing respective $x$ values, a voltage source representing a $y$ value, means for summing the voltages taken off said first potentiometers between the contactors and respective first end terminals thereof, a voltage integrating circuit, and means for connecting said summed voltage in opposition to said $y$ voltage and for applying the resulting voltage to the input of said integrating circuit; $n^2$ second potentiometers, the contactor of each being mechanically coupled to the contactor of a respective one of said first potentiometers, and means connecting the output voltages of each of said integrating circuits across the end terminals of each of the second potentiometers connected to the first potentiometers in circuit with the respective integrating circuits; means for summing the voltages taken between the contactors and respective first end terminals of the second potentiometers which represent like terms in said system of equations; and means for applying said last-mentioned summed voltages across the end terminals of each of the first potentiometers connected to the second potentiometers from which said last-mentioned summed voltages are obtained, said last-mentioned summed voltages representing the $x$ values in said system of equations.

7. The combination in accordance with claim 6 wherein said $n$ summing amplifiers each comprises a three stage resistance-capacitance coupled vacuum tube amplifier, an output transformer having center-tapped primary and secondary coils, the output of said amplifier being applied to one end terminal of the primary coil of said transformer, a triode having its plate connected to the second end terminal of said primary coil, means for applying a biasing potential to the grid of said triode proportional to the output of said amplifier, said triode and the third tube of said amplifier having common cathode circuits, a common source of plate potential applied to the center tap of said primary coil, the center tap of said secondary coil being grounded, and a feedback resistor connecting said secondary coil to the input of said amplifier.

8. A computer for evaluating all $n$ of the $x_j$ in a system of equations of the form $$\sum_{j=1}^{n} a_{ij}x_j = y_i$$

where $i=1$ to $n$, $n$ being any positive integer, and $y_i$ being constants, comprising, in combination; $n^2$ first and second potentiometers, the contactors of said potentiometers being mechanically coupled in pairs, each of said pairs including one first and one second potentiometer, each of said pairs of potentiometers representing an $a$ respective $ax$ term, the common contactor settings of each of said pairs of potentiometers representing a respective $a$ value; $n$ voltage sources, each representing a respective $y$ value; $n$ voltage integrating circuits; $n$ voltage summing amplifiers; and circuit means interconnecting said potentiometers, integrating circuits and summing amplifiers, said circuit means comprising $n$ like means for adding the voltages between the contactors and respective first end terminals of said first potentiometers representing the terms of each of said equations, $n$ like means for connecting said added voltages in opposition to respective ones of said voltage sources, $n$ like means for applying the net opposing voltages to the inputs of respective ones of said integrating circuits, $n$ like means for applying the output voltages of said integrating circuits across the end terminals of each of the second potentiometers coupled to the first potentiometers which are connected to the inputs of said respective integrator circuits, *n* like means for adding the voltages between the contactors and respective first end terminals of said second potentiometers representing corresponding terms in said *n* equations, *n* like means for connecting said last-mentioned added voltages to the inputs of respective ones of said voltage summing amplifiers, and *n* like means for applying the output voltages of said summing amplifiers across the end terminals of each of the first potentiometers coupled to the second potentiometers which are connected to the input of said respective amplifier circuits, *n* said amplifier output voltages representing respective *x* values.

9. The combination in accordance with claim 8 wherein said voltage integrating circuits provide both positive and negative output voltages of equal magnitude and wherein said voltage summing circuits provide both positive and negative voltages of equal magnitude, and further comprising switching means associated with each of said pairs of potentiometers, said switching means being adapted to apply a negative output voltage from an integrating circuit across an associated second potentiometer when a positive output voltage from a summing amplifier is applied across the first potentiometer coupled to said associated second potentiometer and being adapted to apply a positive output voltage from said integrating circuit across said associated second potentiometer when a negative output voltage from said summing amplifier is applied across the first potentiometer coupled thereto.

10. The combination in accordance with claim 9 wherein said *n* summing amplifiers each comprises a three stage resistance-capacitance coupled vacuum tube amplifier, an output transformer having center-tapped primary and secondary coils, the output of said amplifier being applied to one end terminal of the primary coil of said transformer, a triode having its plate connected to the second end terminal of said primary coil, means for applying a biasing potential to the grid of said triode proportional to the output of said amplifier, said triode and the third tube of said amplifier having common cathode circuits, a common source of plate potential applied to the center tap of said primary coil, the center tap of said secondary coil being grounded, and a feedback resistor connecting said secondary coil to the input of said amplifier.

11. The combination in accordance with claim 9 wherein said *n* integrating circuits each comprises a pair of potentiometers, a source of voltage applied between end terminals of said potentiometers, the center taps of said potentiometers being grounded, and output terminals connected to the contactors of said potentiometers; a motor adapted to simultaneously rotate the contactors of said potentiometers at a speed proportional to the input voltage applied thereto; and a feedback generator driven by said motor to supply a voltage in opposition to the input applied voltage.

References Cited in the file of this patent

UNITED STATES PATENTS

| | | |
|---|---|---|
| 2,439,381 | Darlington | Apr. 13, 1948 |
| 2,469,627 | Bowman | May 10, 1949 |
| 2,489,106 | Peterson | Nov. 22, 1949 |
| 2,558,430 | Goldberg | June 26, 1951 |
| 2,595,185 | Zauderer et al. | Apr. 29, 1952 |
| 2,637,495 | Bubb | May 5, 1953 |
| 2,656,977 | Cummings | Oct. 27, 1953 |

OTHER REFERENCES

"Electronic Computers," Shannon, August 1946, Electronics, pages 110–113.

"Electrical Analogue Computing," Mynall, July 1947, Electronic Engineering, pages 214–217.